June 25, 1968    J. A. GIORDMAINE ET AL    3,390,278
OPTICAL LIQUID PARAMETRIC DEVICES WITH
INCREASED COHERENCE LENGTH USING DYE
Filed April 12, 1966

INVENTORS J. A. GIORDMAINE
P. M. RENTZEPIS
BY
ATTORNEY

United States Patent Office 3,390,278
Patented June 25, 1968

3,390,278
OPTICAL LIQUID PARAMETRIC DEVICES WITH INCREASED COHERENCE LENGTH USING DYE
Joseph A. Giordmaine, Summit, and Peter M. Rentzepis, Bernardsville, N.J., assignors to Bell Telephone Laboratories, Incorporated, New York, N.Y., a corporation of New York
Filed Apr. 12, 1966, Ser. No. 542,074
8 Claims. (Cl. 307—88.3)

This invention relates to the production of high frequencies through mixing and, more particularly, to optical frequency mixers utilizing liquid solutions as the optically active medium.

The present state of the art in the generation of coherent optical frequencies is such that there are gaps in the optical spectrum for which no adequate generators have been found. In particular, the high frequency end of the optical spectrum and the extreme low frequency end have not been produced by oscillators with any great degree of success, except for a mall number of specific frequencies. The application of optical frequency mixing in optically active materials, primarily crystals, to the problem has resulted in some degree of success. However, such processes generally require very special crystals which may be quite expensive to produce, fragile, or extremely temperature sensitive, or all of these. In addition, most optically active crystals are doubly refracting, which makes phase matching difficult. As a consequence, a material possessing none of these drawbacks would greatly simplify the utilization of the mixing process.

The present invention is based upon the discovery that certain materials having molecules with asymmetric carbon atoms are highly optically active and, in principle, are capable of operating as the active element in optical mixing. When these materials are used in liquid solution, they are neither fragile nor temperature sensitive within a fairly wide range of temperatures. Another advantage of these materials in solution is that they are not doubly refracting. It has been found that those materials classed as sugars are among the most optically active, and that a simple sugar and water solution is capable of functioning as an excellent optical mixer. Interestingly enough, ordinary table sugar, which is extremely pure, when in solution makes a good optical mixer.

There are a number of other materials which satisfy the criterion of asymmetry of the carbon atoms but in many cases these materials tend to be inferior to sugar solutions for two principal reasons. Sugar is extremely stable chemically and hence, in solution, remains the same indefinitely, while many of the other materials undergo chemical changes which destroy their utility. In addition, sugar has no optical absorption bands over an unusually broad portion of the optical spectrum, whereas a large number of the other materials have one or more absorption bands falling within that portion of the spectrum that is of the greatest interest.

Although the various sugars are, in general, potentially useful as mixers, there are certain characteristics which limit this usefulness. Like most optically active materials, the index of refraction of a sugar solution increases with frequency, hence when two different frequencies are to be mixed, the resultants of the mixing process cannot be phase matched over any appreciable length and the output wave resulting is of low intensity or amplitude. One wave resulting from the mixing is a polarization wave which in turn radiates an electromagnetic wave within the material, and, in general, the coherent length of these two generated waves is quite short through lack of phase matching which, as will be seen hereinafter, tends to reduce the amplitude of the mixer output still further.

The applicants have found that phase matching and hence increased coherence length can be achieved in sugar solutions by creating within the solution an anomalous index of refraction characteristic which presents substantially the same index of refraction to the two waves that are generated by the mixing process. This is accomplished by the addition of a dye to the solution to create an absorption peak at a frequency lying between one of the input frequencies and the output frequency. The net result is a coherent output at the desired frequency that is of the order of $10^5$ greater intensity or amplitude than that of a solution without the dye. This greatly increased output results from a greatly increased coherence length for the interaction between the polarization wave and the electromagnetic wave which it generates.

In an illustrative embodiment of the invention, a pair of light beams of, for example 3472 A. and 6943 A. are directed into a sugar solution contained within a fused quartz receptacle at angles to the axis thereof so that they intersect within the liquid. The sugar solution contains a dye which has an absorption peak that lies between 3472 A. and 2314 A., preferably closer to the 2314 A. wavelength than the 3472 A., as will be discussed hereinafter. The dye has the effect of altering the index of refraction of the solution so that the phase velocity of the polarization wave and its radiated wave can be made equal. At the region of intersection of the two beams within the solution, mixing occurs and a traveling polarization wave is produced which generates in the solution, and interacts with, a free electromagnetic wave of 2314 A. wavelengths when the heretofore noted wavelengths are mixed. The output from the solution is, then, an electromagnetic wave that is the sum of the input waves. This output is then directed to any suitable utilization device.

It is a principal feature of the invention that light waves are mixed in a liquid solution composed of a material having asymmetric carbon atoms in a suitable solvent and which is chemically stable. The solution also contains a dye having an absorption peak that occurs at a wavelength which lies between the wavelengths of the higher frequency wave of the input waves and the generated wave, when the generated wave is the sum of the inputs, and between the lower frequency input wave and the generated wave when the latter is the difference frequency.

The various principles and features of the invention will be more readily apparent from the following detailed description taken in conjunction with the accompanying drawings, in which.

Figure 1:
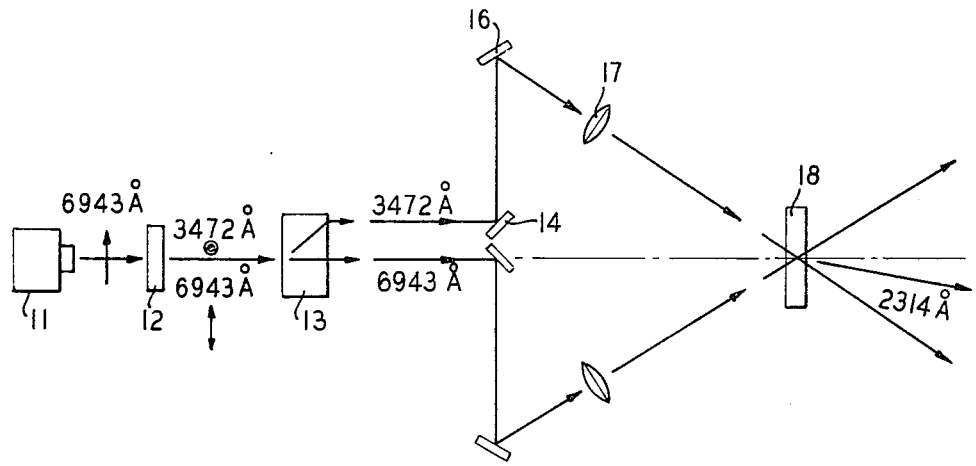
FIG. 1 is a diagrammatic view of one embodiment of the invention.

In FIG. 1 there is shown an arrangement for mixing two frequencies to produce a sum frequency. The 6943 A. vertically polarized output of a Q-switched ruby laser 11 is directed into a harmonic generator crystal 12 of potassium dihydrogen phosphate (KDP) or other suitable material. The output of crystal 12 is a beam containing vertically polarized light of 6943 A. wavelength and orthogonally polarized light of 3472 A. wavelength. This beam is directed into a beam splitter 13 of calcite or other suitable material where it is divided into two separate beams of 3472 A. wavelength and 6943 A. wavelength. The 3472 A. beam is deflected by mirrors 14 and 16 and focused by a lens system 17 along a path that enters and passes through a liquid solution represented by block 18. Preferably block 18 comprises a fused quartz container filled with the optically active solution, however, other suitable arrangements for containing the solution may be used. In the embodiment of FIG. 1, the focused beam at 3472 A. has an angle of incidence on member 18 of $+24°$ approximately. The beam at 6943 A. leaving beam splitter 13 is deflected by mirrors 19 and 21 and focused by lens system 22 into a path having an angle of incidence with member 18 of −24° approximately, and intersects the beam at 3472 A. within the liquid.

At the region of intersection of the two beams within the liquid, they interact with each other as a consequence of the material being optically active or non-linear, and produce a traveling wave of polarization within the liquid. This polarization wave induces within the liquid and interacts with a free electromagnetic wave of 2314 A. wavelength, which corresponds to the sum frequency of the two input waves. The direction of the induced wave is such as to satisfy the $k$ vector relationship common to mixing processes.

Figure 2:
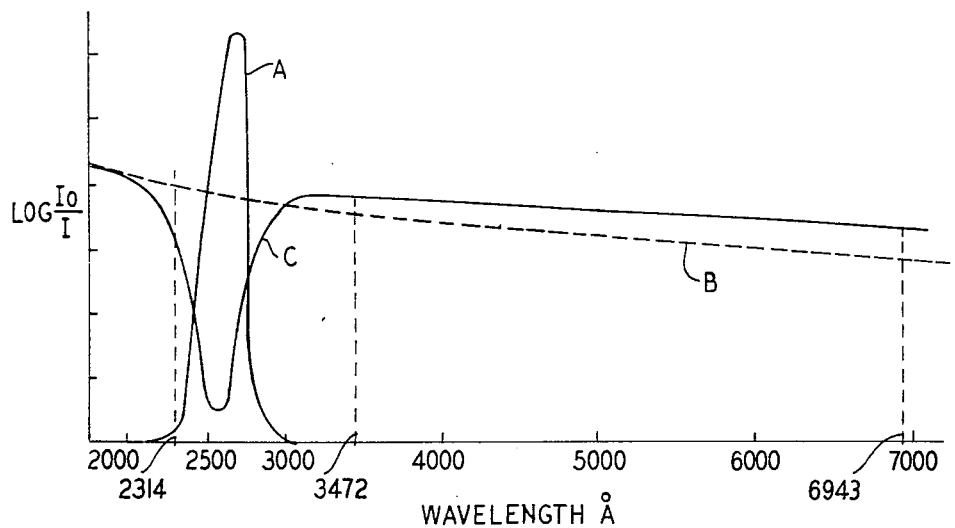
FIG. 2 is a diagram illustrating certain characteristics of the solution used in FIG. 1.

In a solution of the type used in the embodiment of FIG. 1, the index of refraction varies with frequency as it does in most optical materials. As a consequence the coherence length or mixing volume of the two incident beams is quite small. In order to achieve a greater coherence length, a dye having an absorption peak in the frequency region of interest is added to the solution. This dye creates an anomaly in the index of refraction curve of the material. FIG. 2 is a diagram of the effect of such a dye when added to an arabinose sugar solution. Curve A of FIG. 2 is the absorption characteristic of the dye in terms of optical density versus wavelength. The density is in terms of log $I_0/I$ where $I_0$ is magnitude of the incident light and I is the magnitude of the transmitted light. It can be seen that the absorption peak or maximum occurs in the region of 2700 A. wavelength.

The dashed curve B is the index of refraction $\eta$ characteristic for an arabinose solution with no dye added. No numbers have been assigned to the $\eta$ scale inasmuch as actual numerical values vary with the particular solution. The general shape of the curve remains the same, however. The solid curve C is the index of refraction characteristic of the solution with the dye added. It can be seen that the dye creates an anomaly in the index of refraction in the region of the absorption peak. At shorter wavelengths, the index of refraction, because of the dip caused by the dye, is less than that for the undyed solution. Thus the index of refraction for the 2314 A. beam is less than it normally would be, and, with a properly chosen dye, can be made equal to that for the polarization wave. In the case of an arabinose solution, the addition of a dye such as cis-stilbene produces a result such as that shown in FIG. 2.

The change in index of refraction as shown in FIG. 2 results in a greatly increased coherence length for the two generated waves, resulting in an output wave that is of approximately $10^5$ greater intensity than for an undyed solution.

While the curves of FIG. 2 are particularly applicable to arabinose solutions, the characteristics of various other sugar solutions behave in the same manner. Some of the many sugars that may be used besides arabinose are glucose, fructose, sucrose, and galactose. All of these are characterized by chemical stability and an asymmetric carbon atom. The restriction on the dye used is that it produce an anomalous index of refraction characteristics so that the index of refraction is approximately the same for the polarization wave and the free electromagnetic wave that it radiates. This in turn depends upon the frequencies used and the type of solution. Some of the many dyes found useful are various ones of the polymethinium dyes, phthalones, amidinium vinylogs and phridocyanine dyes.

The discussion has dealt with mixing two input waves to produce a sum frequency output. In any mixing process, both sum and different frequencies are produced. The principles of the invention are, of course, applicable to the production of difference frequencies also. This is especially useful at the lower end of the optical spectrum where there exists a gap between the high microwave frequencies and the far infra-red frequencies. This gap can be filled to a large extent by utilizing the principles of the invention to produce difference frequencies.

While the foregoing has dealt primarily with sugar solutions, various other solutions of chemically stable materials having asymmetric carbon atoms may be used. An example of such a material is camphor. In addition, inasmuch as a non-linear, three frequency, phase matched phenomenon is created, other functions such as oscillation, modulation and amplification may be utilized.

The foregoing discussion has been intended to illustrate the principles of the invention. Numerous other embodiments and applications of the principles of the invention may occur to workers in the art without departure from the spirit and scope of the invention.

What is claimed is:

1. A high frequency mixing arrangement comprising a liquid solution having a chemically stable constituent characterized by an asymmetric carbon atom, means for directing first and second light beams into said solution at an angle to each other such that said beams intersect within the solution and mix to produce a polarization wave and a free wave within the solution, and means within the solution for increasing the coherence length of the produced waves comprising a substance having an absorption peak which occurs at a wavelength lying between the wavelengths of the generated waves and the higher frequency wave of said first and second light beams.

2. A high frequency mixing arrangement as claimed in claim 1 wherein said chemically stable constituent is one of the class of materials designated as sugars.

3. A high frequency mixing arrangement as claimed in claim 1 wherein said chemically stable constituent is arabinose.

4. A high frequency mixing arrangement as claimed in claim 1 wherein said chemically stable constituent is camphor.

5. A high frequency mixing arrangement as claimed in claim 1 wherein said means for increasing the coherence length is the dye cis-stilbene.

6. A high frequency mixing arrangement as claimed in claim 1 wherein the wavelength of said first beam is 3472 A., the wavelength of said second beam is 6943 A., the wavelength of the generated free wave is 2314 A., and the absorption peak of the dye lies between 2314 A. and 3472 A.

7. An optical frequency mixer comprising an optically active, chemically stable solution, containing a material having molecules with asymmetric carbon atoms, means for generating first and second optical beams of different wavelength, means for directing said beams at an angle to each other to an intersection point within the solution, and means for producing an anomaly in the index of refraction characteristic of the solution comprising a dye contained within said solution having an absorption characteristic such that the index of refraction of the solution for waves generated by the intersection of said first and second beams is approximately the same for each of the waves.

8. An optical frequency mixer as claimed in claim 7 wherein the absorption peak of said dye occurs at a frequency lying between the frequency of the generated waves and the frequency of the input wave closest thereto.

No references cited.

ROY LAKE, *Primary Examiner.*

D. R. HOSTETTER, *Examiner.*